(12) United States Patent
Aurenty et al.

(10) Patent No.: US 6,472,054 B1
(45) Date of Patent: *Oct. 29, 2002

(54) METHOD OF PREPARING A PRINTING PLATE AND PRINTING PLATE

(75) Inventors: Patrice M. Aurenty, Wood-Ridge, NJ (US); Alexander Grant, Bloomfield, NJ (US); William P. Keaveney, Pompton Plains, NJ (US); Edward Stone, Morris Plains, NJ (US)

(73) Assignee: Kodak Polychrome Graphics LLC, Norwalk, CT (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/494,224

(22) Filed: Jan. 27, 2000

Related U.S. Application Data

(63) Continuation-in-part of application No. 09/244,580, filed on Feb. 4, 1999.

(51) Int. Cl.⁷ .............................. B32B 3/00; B41N 1/00; B41M 5/00
(52) U.S. Cl. ................... 428/195; 428/209; 428/211; 428/461; 101/457; 101/462; 101/463.1; 101/465; 101/466; 101/468
(58) Field of Search ............................... 428/500, 461, 428/195, 209, 211; 101/466, 465, 457, 463.1, 462, 468

(56) References Cited

U.S. PATENT DOCUMENTS

| | | | |
|---|---|---|---|
| 3,877,372 A | 4/1975 | Leeds | 101/465 |
| 4,278,467 A | 7/1981 | Fedner | 106/2 |
| 4,365,043 A | 12/1982 | Konishi et al. | 525/113 |
| 4,544,624 A | 10/1985 | Nanpei et al. | 430/281 |
| 4,718,340 A | 1/1988 | Love, III | 101/116 |
| 4,781,985 A | 11/1988 | Desjarlais | 428/421 |
| 4,833,486 A | 5/1989 | Zerillo | 346/1.1 |
| 4,854,969 A | 8/1989 | Bassemir et al. | 106/2 |
| 4,954,395 A | 9/1990 | Hasegawa et al. | 428/318.4 |
| 5,096,781 A | 3/1992 | Vieira et al. | 428/411.1 |
| 5,104,484 A * | 4/1992 | Nakanishi et al. | 156/651 |
| 5,141,556 A | 8/1992 | Matrick | 106/20 |
| 5,171,655 A * | 12/1992 | Aoshima | 430/138 |
| 5,198,467 A * | 3/1993 | Milks | 514/553 |
| 5,266,443 A | 11/1993 | Higashi et al. | 430/272 |
| 5,312,654 A * | 5/1994 | Arimatsu et al. | 427/511 |
| 5,316,575 A | 5/1994 | Lent et al. | 106/20 R |
| 5,364,702 A | 11/1994 | Idei et al. | 428/423.1 |
| 5,368,974 A | 11/1994 | Walls et al. | 430/156 |
| 5,478,631 A | 12/1995 | Kawano et al. | 428/212 |
| 5,551,585 A | 9/1996 | Huang et al. | 216/11 |
| 5,656,701 A | 8/1997 | Miyamoto et al. | 525/453 |
| 5,677,106 A * | 10/1997 | Burberry et al. | 430/253 |
| 5,716,436 A | 2/1998 | Sorriero et al. | 106/31.87 |
| 5,738,013 A | 4/1998 | Kellett | 101/463.1 |
| 5,773,194 A | 6/1998 | Hattori et al. | 430/284.1 |
| 5,820,932 A | 10/1998 | Hallman et al. | 427/261 |
| 5,821,283 A | 10/1998 | Hesler et al. | 523/161 |
| 5,861,230 A | 1/1999 | Lambert et al. | 430/202 |
| 5,900,345 A | 5/1999 | Platzer et al. | 430/156 |
| 5,942,335 A | 8/1999 | Chen et al. | 428/500 |
| 6,017,677 A * | 1/2000 | Maemoto et al. | 430/270.1 |
| 6,131,514 A * | 10/2000 | Simons | 101/466 |
| 6,207,346 B1 * | 3/2001 | Johnson | 430/284.1 |
| 6,245,121 B1 | 6/2001 | Aurenty et al. | 428/304.4 |

FOREIGN PATENT DOCUMENTS

| | | |
|---|---|---|
| CA | 2107980 | 4/1994 |
| DE | 4330428 | 3/1994 |
| EP | 071345 | 2/1983 |
| EP | 101266 | 2/1984 |
| EP | 0503621 | 9/1992 |
| EP | 591916 | 4/1994 |
| EP | 0738608 | 10/1996 |
| EP | 751194 | 1/1997 |
| EP | 829574 | 3/1998 |
| EP | 847868 | 6/1998 |
| EP | 882584 | 12/1998 |
| GB | 2332646 | 6/1999 |
| JP | 62059046 | 9/1988 |
| JP | 63224988 | 9/1988 |
| JP | 9029926 | 2/1997 |
| JP | 9255765 | 9/1997 |
| JP | 08329147 | 6/1998 |
| JP | 10151852 | 6/1998 |
| WO | WO0046036 | 8/2000 |

\* cited by examiner

*Primary Examiner*—Paul Thibodeau
*Assistant Examiner*—Monique R. Jackson
(74) *Attorney, Agent, or Firm*—Baker Botts LLP

(57) ABSTRACT

A printing plate is prepared by the method comprising: (a) providing a substrate; and (b) applying by ink jetting to the substrate a fluid composition comprising an acidic polymeric compound, in which the acid groups of the acidic polymeric compound are at least partially neutralized with base, providing a printing plate that is ready-to-use on a press without having to develop it. The printing plate of this invention is capable of extended press run length and advantageously avoids the need of chemical development.

19 Claims, No Drawings

METHOD OF PREPARING A PRINTING PLATE AND PRINTING PLATE

CROSS-REFERENCE TO RELATED APPLICATION

This is a continuation-in-part of U.S. patent application Ser. No. 09/244,580, filed Feb. 4, 1999 still pending, which is hereby incorporated by reference in its entirety.

FIELD OF THE INVENTION

This invention relates to a printing plate, a method of making such a printing plate, and a method of printing using such a plate to form a desired image on a medium. More particularly, the printing plate of this invention employs a fluid composition comprising an acidic polymeric compound that is base-neutralized to adhere to a substrate that has a plurality of acidic sites. The fluid composition is applied by ink jetting to a substrate, providing a printing plate that is ready-to-use on a press without having to develop it.

BACKGROUND OF THE INVENTION

The offset lithographic printing process has long used a developed planographic printing plate having oleophilic image areas and hydrophilic non-image areas. The plate is commonly dampened before or during inking with an oil-based ink composition. The dampening process utilizes an aqueous fountain solution such as those described in U.S. Pat. Nos. 3,877,372, 4,278,467 and 4,854,969. When water is applied to the plate, the water will form a film on the hydrophilic areas, which are the non-image areas of the plate, but will contract into tiny droplets on the oleophilic plate areas, which are the image areas. When a roller carrying an oil-based ink composition is passed over the dampened plate, it will not ink the non-image areas that are covered by the aqueous film, but will emulsify the water droplets on the water repellant image areas, which will then take up ink. The resulting ink image is transferred, or "offset," onto a rubber blanket, which is then used to print onto a medium such as paper.

It has been proposed to apply "direct" ink jet printing techniques to lithographic printing. For example, European Patent Publication No. 503,621 discloses a direct method to make lithographic plates by jetting a photocurable ink onto the plate substrate, and then exposing the plate to ultraviolet radiation to harden the image area. An oil-based ink may then be transferred to the image area for printing onto a printing medium. But, neither the resolution of ink drops jetted onto the substrate, nor the durability of the lithographic printing plate with respect to printing runlength was disclosed.

It has also been proposed to apply the direct ink jet printing techniques DI) without the additional steps of chemical development of the plate. This approach advantageously results in lower production costs and a more environmentally acceptable printing process. However, in such techniques it is difficult to control the spreading of the ink-jetted fluid that forms the oleophilic ink-accepting regions on the printing plate substrate. Such "dot spreading" causes lower printing image resolution and reduced image quality. For example, European Patent Application No. 591,916 A2 discloses a water-based ink having a polymer containing anhydride groups which are thermally cross-linked with a hydroxy-functional polymer. This formulation is applied by jetting the formulation which is at room temperature onto a room temperature substrate. However, this formulation does not achieve good control of dot spreading.

U.S. Pat. No. 4,833,486 discloses the apparatus and process for imaging a plate with a "hot melt" type of ink jet printer. The image is produced by jetting at high temperature a "phase change" type of ink which solidifies when it hits the cooler substrate. The ink becomes instantaneously solid rather than remaining a liquid or gel which is thereafter cured to form a solid. However, such an ink does not provide good resistance to press run due to the wax-type nature of the ink formulation.

European Patent Publication No. 0/101,266 describes a printing plate that may be implemented by ink jet printing a non-polymerizable carboxylic acid compound to a substrate. The compound should be oleophilic and amenable to application as a thin layer on the substrate. Polyvinyl butyral and acrylic resin in toluene solution are disclosed as potential compounds for the oleophilic layer, although never used. The use of an acidic polymeric compound that is base-neutralized as the oleophilic compound to adhere to a substrate is not disclosed.

Thus, it would be advantageous to employ a printing plate capable of extended press run length which does not require chemical development.

It is one object of this invention to provide such a printing plate. It is another object of this invention to provide a method of preparing such a printing plate. It is yet another object of this invention to provide a method of using such a printing plate. The printing plate of this invention may advantageously be prepared without a chemical development step typically required. The printing plate of this invention is also capable of extended press run length.

SUMMARY OF THE INVENTION

The fluid composition of this invention is suitable for ink jetting upon a substrate and comprises an acidic polymeric compound, in which the acid groups of the polymeric compound are at least partially neutralized with a base. The fluid composition can be aqueous or non-aqueous.

The printing plate of this invention is prepared by: (a) providing a substrate; and (b) applying by ink jetting to the substrate a fluid composition as described. In preferred embodiments, acidic polymeric compounds suitable for this invention are polymers and copolymers prepared from at least one monomer selected from the group consisting of acrylic acid, methacrylic acid, maleic acid, maleic anhydride, fuimaric acid, fumaric anhydride, ethylenically unsaturated sulfonic acid, sulfonated styrene, and mixtures or derivatives thereof. In particularly preferred embodiments, the acidic polymeric compound is partially or fully neutralized with base, and the fluid composition is ink jetted onto the substrate.

The printing plate of this invention is capable of extended press run length and advantageously avoids the need of chemical development.

DETAILED DESCRIPTION OF THE INVENTION

To achieve extended printing runs, the oleophilic material must adhere well to the substrate. Adhesion of the oleophilic material may be controlled in at least two ways. First, the oleophilic material should have a chemical interaction with the substrate that provides a type of chemical binding and promotes adhesion. For example, the chemical composition of the oleophilic material can be varied to promote its adhesion to the substrate. Also, the composition of the substrate can be varied to increase binding of the oleophilic material. Second, the substrate should provide microscopic topology that allows the oleophilic material to interlock mechanically with the substrate when dry or hardened. Mechanical interlocking can be affected by roughening the surface of the substrate. Thus, by controlling these variables, a printing plate can be made with increased adhesion of the oleophilic material, and correspondingly longer printing run operation.

In the invention described here, the oleophilic material is placed on the substrate by ink jetting a fluid composition comprising the oleophilic material. The fluid composition can be aqueous or non-aqueous. Because the fluid composition is the vehicle to carry the oleophilic material, the wettability of the substrate by the ink-jetted droplets of fluid composition and the spreading of the ink-jetted droplets are properties that affect resolution of the printing process. Too much spreading of the ink-jetted droplets of fluid composition will reduce printing resolution. The substrates used here typically have high surface tension and allow fluids to spread completely and rapidly over their surface. While this benefits adhesion of the oleophilic material to the substrate, it disadvantageously reduces image resolution in printing. Here, the fluid composition is prepared to balance these properties, and provide good adhesion for longer press runs in conjunction with high image resolution.

The spreading of droplets is reduced in two ways by the present invention. First, the fluid composition comprising the oleophilic material is interfacially matched to the substrate, as described below. Second, by pretreating the substrate surface with a surfactant to lower its surface tension, the wetting and spreading of droplets is reduced. Thus, by these and other features inherent in the composition and method described here, excellent resolution can be obtained, as well as long-lasting adhesion of the dried oleophilic material to the substrate.

The printing plate of this invention encompasses lithographic printing plates, flexographic printing plates, and gravure printing plates.

Conventional printing plate substrates such as aluminum, polymeric film, and paper may be used as the printing plate substrate of this invention. The printing plate substrate may be subjected to treatments such as electrograining, anodization, and silication to enhance its surface characteristics. The surface characteristics that are to modified by such treatments are roughness, topology, and the nature and quantity of surface chemical sites. In preferred embodiments, the substrate surface of this invention comprises a plurality of acidic sites.

Substrates that can be employed are given in Table 1. Substrates chosen for use in this invention are preferably based on aluminum oxide, and may be subjected to various conventional surface treatments as are well known to those skilled in the art to give a surface that has a plurality of acidic sites in the Bronsted acid-base view. These treatments also result in different surface roughness, topology, and surface chemical sites, as summarized in Table 1.

TABLE 1

Substrates for printing plates

| Substrate name | Surface Treatment | Interlayer Treatment | Surface Property |
|---|---|---|---|
| AA | Quartz Grained and Anodized | None | Acidic |
| EG-PVPA | Electrograined and Anodized | Polyvinyl phosphoric acid | Acidic |
| PF | Electrograined and Anodized | Sodium dihydrogen phosphate / Sodium fluoride | Acidic |
| G20 | Electrograined and Anodized | Vinylphosphonic acid/acrylamide copolymer | Acidic/ Amphoteric |
| EG-Sil | Electrograined and Anodized | Sodium Silicate | Basic |
| DS-Sil | Chemically Grained and Anodized | Sodium Silicate | Basic |
| PG-Sil | Pumice Grained and Anodized | Sodium Silicate | Basic |
| CHB-Sil | Chemically Grained, Anodized and Silicated | Sodium Silicate | Basic |

"AA" means "as anodized." The aluminum surface is first quartz grained and then anodized using DC current of about 8 A/cm$^2$ for 30 seconds in a $H_2SO_4$ solution (280 g/liter) at 30° C.

"EG" means "electrolytic graining." The aluminum surface is first degreased, etched and subjected to a desmut step (removal of reaction products of aluminum and the etchant). The plate is then electrolytically grained using an AC current of 30–60 A/cm$^2$ in a hydrochloric acid solution (10 g/liter) for 30 seconds at 25° C., followed by a post-etching alkaline wash and a desmut step. The grained plate is then anodized using DC current of about 8 A/cm$^2$ for 30 seconds in a $H_2SO_4$ solution (280 g/liter) at 30° C.

"PVPA" is a polyvinylphosphonic acid. The plate is immersed in a PVPA solution and then washed with deionized water and dried at room temperature.

"DS" means "double sided smooth." The aluminum oxide plate is first degreased, etched or chemically grained, and subjected to a desmut step. The smooth plate is then anodized.

"Sil" means the anodized plate is immersed in a sodium silicate solution to coat it with an interlayer. The coated plate is then rinsed with deionized water and dried at room temperature.

"PG" means "pumice grained." The aluminum surface is first degreased, etched and subjected to a desmut step. The plate is then mechanically grained by subjecting it to a 30% pumice slurry at 30° C., followed by a post-etching step and a desmut step. The grained plate is then anodized using DC current of about 8 A/cm$^2$ for 30 seconds in an $H_2SO_4$ solution (280 g/liter) at 30° C. The anodized plate is then coated with an interlayer.

"G20" is a printing plate substrate which is described in U.S. Pat. No. 5,368,974, the disclosure of which is incorporated herein by reference in its entirety.

"CHB" means chemical graining in a basic solution. After an aluminum substrate is subjected to a matte finishing process, a solution of 50 to 100 g/liter NaOH is used during graining at 50 to 70° C. for 1 minute. The grained plate is then anodized using DC current of about 8 A/cm$^2$ for 30 seconds in an $H_2SO_4$ solution (280 g/liter) at 30° C. The anodized plate is then coated with a silicated interlayer.

"PF" substrate has a phosphate fluoride interlayer. The process solution contains sodium dihydrogen phosphate and sodium fluoride. The anodized substrate is treated in the solution at 70° C. for a dwell time of 60 seconds, followed by a water rinse, and drying. The deposited dihydrogen phosphate is about 500 mg/m$^2$.

"basic" surface will have a plurality of basic sites and acidic sites present, with the basic sites predominating to some degree. Similarly, an "acidic" surface will have a plurality of acidic sites and basic sites present, with the acidic sites predominating to some degree. It is known by one of ordinary skill in the art that the PG-Sil printing plate substrate appears to have a higher silicate site density than the DS-Sil printing plate substrate, and is more basic. It is also known that the G20 printing plate substrate exhibits less acidic character than AA printing plate substrates.

In preferred embodiments, the oleophilic compound of the present invention that forms the ink-receiving layer may be prepared from a starting polymer that comprises acid groups by partially or fully neutralizing the acid groups with base to give a product polymer that comprises the acid groups and conjugate base groups, or comprises solely the conjugate base groups. The oleophilic product polymer is used to make long-lasting printing plates by enhancing the adhesion of the product polymer to the substrate. The conjugate base groups of the product polymer react with the acidic sites of the substrate in ionic double exchange to bind the polymer to the substrate. This chemical binding works in combination with the physico-chemical adsorption of the product polymer to the roughened substrate to provide strong adhesion of the ink-receiving layer, a more durable printing plate, and longer printing press runs.

The starting polymer of preferred embodiments comprises an acidic polymeric material. The starting polymer can be a homopolymer, copolymer, terpolymer, and the like. By "copolymer" we mean any polymer comprised of more than one type of monomer, prepared in a copolymerization. By "terpolymer" we mean a polymer consisting essentially of three types of monomers, prepared in a copolymerization. Thus, a copolymer can include a terpolymer.

The starting polymer most preferably comprises an acidic polymeric compound which is a polymer or copolymer prepared from at least one monomer selected from the group consisting of acrylic acid, methacrylic acid, maleic acid, maleic it anhydride, fumaric acid, fumaric anhydride, ethylenically unsaturated sulfonic acid, sulfonated styrene, and mixtures thereof. These polymers comprise acid groups that react with base to produce conjugate base groups that react with the substrate. The acidic polymeric compound is at least partially neutralized with base, preferably ammonia, to create the conjugate base groups that can react with the substrate and form the ink-receiving layer.

Bases suitable for neutralizing the acid groups of the acidic polymeric compound are selected from the group consisting of amines, ethanolamines, and the like. Bases used in preferred embodiments are ammonia and dimethylethanolamine, while ammonia is especially preferred.

The ink-receptive layer produced with the oleophilic compound has excellent adhesion to the substrate surface, and as set forth in further detail below, the resulting printing plate exhibits extended press run length. Advantageously, the superior results of the printing plate of this invention are achieved without chemical development.

The fluid composition comprising the oleophilic compound is preferably applied by ink jetting to the substrate surface, typically by an ink jet printer using equipment and techniques which are well known to those skilled in the art.

In this manner, the substrate is imaged so that after the fluid composition dries, an ink receptive layer is formed in the desired image on the surface of the substrate.

Without intending to be bound by any one particular theory, the nature of the oleophilic compound employed in this invention enhances the resolution achieved in printing because the fluid composition can be "interfacially matched" to the substrate. By "interfacial matching" we mean providing an oleophilic compound comprising conjugate acid groups to be used with a basic substrate, or conversely, providing an oleophilic compound comprising conjugate base groups to be used with an acidic substrate. The droplet of fluid composition on the substrate spreads as a primary film in advance of the bulk of the droplet. Further, solvent and base in the advancing primary film evaporate relatively quickly, leaving behind an increased concentration of acid groups on the oleophilic compound. These acid groups exhibit repulsion from the acidic sites of the substrate, and slow the spreading of the droplets of fluid composition on the substrate surface. At the same time, in the bulk of the droplet, an excess of conjugate base groups on the neutralized compound continue to give good adhesion to the substrate. Thus, reduced droplet spreading is achieved with good adhesion of the oleophilic compound to the acidic substrate.

In preferred embodiments, the fluid composition contains a humectant when the fluid composition is aqueous, to prevent clogging of the ink jet nozzle during idle periods. Suitable humectants include glycerol, aliphatic glycols, aliphatic glycol ethers, and mixtures thereof. The fluid composition may also contain other additives, such as colorants, biocides, corrosion inhibitors, and anti-foam agents, as used by those of skill in the art of ink jet printing, without loss of the characteristic properties of this invention.

Adsorbing a surfactant to a conventional printing plate substrate, prior to application of an ink receptive layer, can improve the image resolution achieved. Such a surfactant-pretreated substrate will be termed a "printing plate precursor" herein. A printing plate may be prepared from the printing plate precursor by imagewise applying a fluid composition as described above to the substrate. In a preferred embodiment, the fluid composition is applied by means of an ink jet printer, and then dried to form an ink receptive layer in the form of the desired image. Advantageously, chemical development of the printing plate is not required.

Adhesion of the oleophilic compound from the fluid composition to the substrate after drying is not diminished substantially by the presence of the precursor plate surfactant, which tends only to slow the spreading of the droplet deposited by the ink jet nozzle. Thus, the precursor plate surfactant can increase resolution without reducing press run length. Surfactants that can be used for the precursor include alkyl tail surfactants, fluorosurfactants and siliconated surfactants.

Illustrative examples of alkyl tail surfactants include sodium dodecylsulfate, isopropylamine salts of an alkylarylsulfonate, sodium dioctyl succinate, sodium methyl cocoyl taurate, dodecylbenzene sulfonate, alkyl ether phosphoric acid, N-dodecylamine, dicocoamine, 1-aminoethyl-2-alkylimidazoline, 1-hydroxyethyl-2-alkylimidazoline, and cocoalkyl trimethyl quaternary ammonium chloride, polyethylene tridecyl ether phosphate, and the like.

Illustrative examples of fluorosurfactants useful in preferred embodiments of the present invention and their commercial trade names are set forth in Table 2.

TABLE 2

Fluorosurfactants useful in preferred embodiments

| Trade Name | Chemical Structure | Type |
|---|---|---|
| Zonyl FSD | $F(CF_2CF_2)_{1-7}$-alkyl-$N^+R_3Cl^-$ | Cationic |
| Fluorad FC-135 | $C_8F_{17}SO_2NHC_3H_6N^+(CH_3)_3I^-$ | Cationic |
| Zonyl FSA | $F(CF_2CF_2)_{1-7}CH_2CH_2SCH_2CH_2CO_2^-Li^+$ | Anionic |
| Fluorad FC-129 | $C_8F_{17}SO_2N(C_2H_5)CH_2CO_2^-K^+$ | Anionic |
| Zonyl FSP | $(F(CF_2CF_2)_{1-7}CR_2CH_2O)_{1,2}PO\ (O^-NH_4^+)_{1,2}$ | Anionic |
| Zonyl FSJ[1] | $(F(CF_2CF_2)_{1-7}CH_2CH_2O)_{1,2}PO\ (O^-NH_4^+)_{1,2}$ | Anionic |
| Fluorad FC-120 | $C_{10}F_{21}SO_3^-NH_4^-$ | Anionic |
| Zonyl FS-62 | $C_6F_{13}CH_2CH_2SO_3H,\ C_6F_{13}CH_2CH_2SO_3^-NH_4^+$ | Anionic |
| Zonyl FSK | $F(CF_2CF_2)_{1-7}CH_2CHOAcCH_2N^+\ R_2CH_2COO^-$ | Amphoteric |
| Fluorad FC-100[2] | $R^{**}SO_3^-$ | Amphoteric |
| Fluorad FC-170C | $C_8F_{17}SO_2N(C_2H_5)\ (CH_2CH_2O)_xH$ | Nonionic |
| Fluorad FC-171 | $C_8F_{17}SO_2N(C_2H_5)\ (CH_2CH_2O)_xCH_3$ | Nonionic |
| Zonyl FSO[3] | $F(CF_2CF_2)1-7CH_2CH_2O\ (CH_2CH_2O)_yH$ | Nonionic |
| Zonyl FS-300[3] | $F(CF_2CF_2)1-7CH_2CH_2O\ (CH_2CH_2O)_zH\ (z > y)$ | Nonionic |

(1) FSJ also contains a nonfluorinated surfactant.
(2) R** contains an ammonium function.
(3) y or z = 0 to about 25.

ZONYL surfactants are commercially available from E.I. du Pont de Nemours & Co. and have a distribution of perfluoroalkyl chain length. FLUORAD surfactants are commercially available from 3M Company and have a narrow distribution of the hydrophobic chain length.

Illustrative siliconated surfactants include the following non-exhaustive listing: polyether modified poly-dimethyl-siloxane, silicone glycol, polyether modified dimethyl-polysiloxane copolymer, and polyether-polyester modified hydroxy functional polydimethyl-siloxane.

The precursor plate surfactant may be adsorbed onto the substrate by any conventional method, preferably by immersion of the substrate in an aqueous solution of the surfactant for a time, typically one minute, which is effective to permit adsorption of the surfactant upon the substrate. In a particularly preferred embodiment, any non-adsorbed surfactant is then removed from the printing plate substrate surface. Preferably, the substrate is rinsed with water to remove non-adsorbed surfactant, then dried. The resulting printing plate precursor has a surfactant on at least one surface, in an amount effective to improve the resolution of printing.

An imaged substrate prepared by imagewise applying a fluid composition to a substrate could also be used, for example, as a precursor for a printed circuit board in which conductive metals are deposited onto the imaged substrate.

The following examples are given to illustrate preferred embodiments of the present invention and are not intended to limit the invention in any way. It should be understood that the present invention is not limited to the above-mentioned embodiments. Numerous modifications can be made by one skilled in the art having the benefits of the teachings given here. Such modifications should be taken as being encompassed within the scope of the present invention as set forth in the appended claims.

EXAMPLE 1

Fluid composition R2884-143 was prepared by first dissolving JONCRYL 678, a styrene-acrylic copolymer having a weight average molecular weight of 8,500, an acid number of 215, and a $T_g$ of 85° C. (S. C. Johnson & Son, Inc., Racine, Wis.), in an amount of aqueous dimethylethanolamine effective to neutralize the copolymer, then adding this solution to a mixture of glycerol humectant and SURFYNOL 465 ink jet surfactant in deionized water. The final composition of this fluid composition was JONCRYL 678, 3 weight percent, glycerol, 2 weight percent, SURFYNOL 465, 0.3 weight percent, dimethylethanolamine, 0.5 weight percent, and deionized water, 94.2 weight percent. Fluid composition R2884-143 was then ink-jetted with an EPSON 740 printer onto AA and PF substrates (Table 1) that were pretreated with FLUORAD FC-129 precursor plate surfactant (0.01 weight percent in water). After drying without processing or curing, the image on the substrates did not rub off with a pad impregnated with ink and water. These printing plates were used in accelerated press trials of 15,000 impressions on paper, and no evidence of image wear was observed. Thus, these plates were suitable for low volume printing. The accelerated press trial used a rubber transfer blanket of high hardness that accelerates wear of the printing plate.

A printing plate that survives an accelerated press trial of fifteen thousand impressions with no evidence of wear of the ink-receiving layer on the substrate or in the printed impressions is suitable for a variety of commercial applications. Such a plate is called suitable for "low volume" printing since a press run of fifteen thousand is a low volume commercial run. It should be noted that passing an accelerated press trial of fifteen thousand impressions with no evidence of wear means that the plate is capable of a substantially longer press run than fifteen thousand under ordinary commercial printing conditions.

A printing plate that shows evidence of wear of the ink-receiving layer on the substrate or in the printed impressions for a run of about one thousand to less than about fifteen thousand impressions is a plate that is suitable for "very low volume" printing. A printing plate that shows evidence of wear of the ink-receiving layer on the substrate or in the printed impressions for a run of less than about one thousand impressions is a plate that is not suitable for commercial printing, although it has utility to form a lithographic image.

EXAMPLE 2

Fluid composition R2884-141 was prepared by first dissolving Fumaric Filtrez 532, R2809-64, a poly-fumaric acid (Akzo Nobel Resins), in an amount of aqueous ammonia effective to neutralize the polymer, then adding this solution to a mixture of glycerol humectant, Dowanol TPNB humectant, and SURFYNOL 465 ink jet surfactant in deionized water. The final composition of this fluid composition was Filtrez 532, 3 weight percent, glycerol, 2.65 weight percent, Dowanol TPNB humectant, 2.65 weight percent, SURFYNOL 465, 0.5 weight percent, ammonia, 0.44 weight percent, and deionized water, 90.76 weight percent. Fluid composition R2884-141 was then inkjetted with an EPSON 740 printer onto AA and PF substrates (Table 1), both pretreated with FLUORAD FC-129 precursor plate surfactant (0.01 weight percent in water), and untreated. After drying without processing or curing, the image on the substrates did not rub off with a pad impregnated with ink and water. These printing plates were used in accelerated press trials with a rubber transfer blanket of high hardness that accelerates wear of the printing plate. For the untreated substrates, evidence of image wear was observed after 5,000 impressions. For the treated substrates, evidence of image wear was observed after 10,000 impressions. Thus, these plates were suitable for very low to low volume printing

EXAMPLE 3

Fluid composition R2884-144 was prepared by first dissolving SMA 1737, a styrene-maleic anhydride copolymer (Elf Atochem), in an amount of aqueous ammonia effective to neutralize the copolymer, then adding this solution to a mixture of glycerol humectant and SURFYNOL 465 ink jet surfactant in deionized water. The final composition of this fluid composition was SMA 1737, 3 weight percent, glycerol, 2 weight percent, SURFYNOL 465, 0.3 weight percent, ammonia, 0.5 weight percent, and deionized water, 94.2 weight percent. Fluid composition R2884-144 was then ink jetted with an EPSON 740 printer onto AA substrate (Table 1), pretreated with FLUORAD FC-129 precursor plate surfactant (0.01 weight percent in water). Fluid composition R2884-144 was also ink-jetted with an EPSON 740 printer onto PF substrates (Table 1), both pretreated with FLUORAD FC-129 precursor plate surfactant (0.01 weight percent in water), and untreated. After drying without processing or curing, the images on the substrates did not rub off with a pad impregnated with ink and water. These printing plates were used in accelerated press trials with a rubber transfer blanket of high hardness that accelerates wear of the printing plate. For both the untreated and treated PF substrates, evidence of image wear was observed after 2,500 impressions. Thus, these plates were suitable for very low volume printing. For the AA substrate, no evidence of image wear was observed after 15,000 impressions. Thus, this plate was suitable for low volume printing.

The invention claimed is:

1. A printing plate prepared by the process comprising:
   (a) providing a substrate; and
   (b) applying by ink jetting to the substrate a fluid composition comprising an acidic polymeric compound, in which acid groups of the acidic polymeric compound are at least partially neutralized with base,
   wherein the substrate is pretreated to form a printing plate precursor with a surfactant selected from the group consisting of alkyl tail surfactants, fluorosurfactants and siliconated surfactants, and the surfactant is present during application of the fluid composition.

2. The printing plate of claim 1, in which the acidic polymeric compound is a polymer or copolymer prepared from at least one monomer selected from the group consisting of acrylic acid, methacrylic acid, maleic acid, maleic anhydride, fumaric acid, fumaric anhydride, ethylenically unsaturated sulfonic acid, sulfonated styrene, and mixtures thereof.

3. The printing plate of claim 1, in which the substrate surface comprises a plurality of acidic sites.

4. The printing plate of claim 1, in which the base is selected from the group consisting of amines, ethanolamines, ammonia, and dimethylethanolamine.

5. The printing plate of claim 1, in which the printing plate is dried subsequent to application of the fluid composition.

6. A printing plate comprising:
   (a) a substrate; and
   (b) a fluid composition applied by ink jetting to the substrate comprising an acidic polymeric compound, in which acid groups of the acidic polymeric compound are at least partially neutralized with base,
   wherein the substrate is pretreated to form a printing plate precursor with a surfactant selected from the group consisting of alkyl tail surfactants, fluorosurfactants and siliconated surfactants, and the surfactant is present during application of the fluid composition.

7. The printing plate of claim 6, in which the acidic polymeric compound is a polymer or copolymer prepared from at least one monomer selected from the group consisting of acrylic acid, methacrylic acid, maleic acid, maleic anhydride, fumaric acid, fumaric anhydride, ethylenically unsaturated sulfonic acid, sulfonated styrene, and mixtures thereof.

8. The printing plate of claim 6, in which the substrate surface comprises a plurality of acidic sites.

9. The printing plate of claim 6, in which the base is selected from the group consisting of amines, ethanolamines, ammonia, and dimethylethanolamine.

10. The printing plate of claim 6, in which the printing plate is dried subsequent to application of the fluid composition.

11. A method of preparing a printing plate comprising:
    (a) providing a substrate; and
    (b) applying by ink jetting to the substrate a fluid composition comprising an acidic polymeric compound, in which acid groups of the acidic polymeric compound are at least partially neutralized with base,
    wherein the substrate is pretreated to form a printing plate precursor with a surfactant selected from the group consisting of alkyl tail surfactants, fluorosurfactants and siliconated surfactants, and the surfactant is present substrate during application of the fluid composition.

12. The method of claim 11, in which the acidic polymeric compound is a polymer or copolymer prepared from at least one monomer selected from the group consisting of acrylic acid, methacrylic acid, maleic acid, maleic anhydride, fumaric acid, fumaric anhydride, ethylenically unsaturated sulfonic acid, sulfonated styrene, and mixtures thereof.

13. The method of claim 11, in which the substrate surface comprises a plurality of acidic sites.

14. The method of claim 11, in which the base is selected from the group consisting of amines, ethanolamines, ammonia, and dimethylethanolamine.

15. The method of claim 11, in which the printing plate is dried subsequent to application of the fluid composition.

16. A method forming an image onto a substrate comprising:
    (a) providing a substrate;
    (b) applying by ink jetting to the substrate a fluid composition comprising an acid polymeric compound, in which acid groups of the acidic polymeric compound are at least partially neutralized with base, wherein the fluid composition forms the image; and
    (c) drying the fluid composition on the substance,
    wherein the substance is pretended to form a printing plate precursor with a surfactant selected form the group consisting of alkyl tail surfactants, fluorosurfactants and siliconated surfactants, and the surfactant is present during application of the fluid composition.

17. An imaged substrate comprising:
    (a) a substrate; and
    (b) a fluid composition imagewise applied to the substrate comprising an acidic polymeric compound, in which acid groups of the acidic polymeric compound are at least partially neutralized with base,
    wherein the substrate is pretreated to form a printing plate precursor with a surfactant selected from the group consisting of alkyl tail surfactants, fluorosurfactants and siliconated surfactants, and the surfactant is present during application of the fluid composition.

18. The imaged substrate of claim 17, in which the fluid composition is applied to the substrate by ink jetting.

19. A method of copying an image onto a medium comprising:
(a) providing a substrate;
(b) applying by ink jetting to the substrate a fluid composition comprising an acidic polymeric compound, in which acid groups of the acidic polymeric compound are at least partially neutralized with base, wherein the fluid composition forms the image;
(c) drying the fluid composition on the substrate;
(d) contacting the dried formed image with an ink thereby coating the formed image with the ink; and
(e) contacting the formed image coated with the ink with a medium capable of receiving the ink in the form of the image, wherein the substrate is pretreated to form a printing plate precursor with a surfactant selected from the group consisting of alkyl tail surfactants, fluorosurfactants and siliconated surfactants, and the surfactant is present during application of the fluid composition.

* * * * *